(12) United States Patent
Rogers

(10) Patent No.: US 12,511,148 B2
(45) Date of Patent: Dec. 30, 2025

(54) SYSTEM AND METHOD SUPPORTING HIGHLY-AVAILABLE REPLICATED COMPUTING APPLICATIONS USING DETERMINISTIC VIRTUAL MACHINES

(71) Applicant: Goldman Sachs & Co. LLC, New York, NY (US)

(72) Inventor: Chaitanya Rogers, Singapore (SG)

(73) Assignee: Goldman Sachs & Co. LLC, New York, NY (US)

( * ) Notice: Subject to any disclaimer, the term of this patent is extended or adjusted under 35 U.S.C. 154(b) by 483 days.

(21) Appl. No.: 18/184,473

(22) Filed: Mar. 15, 2023

(65) Prior Publication Data

US 2024/0311170 A1 Sep. 19, 2024

(51) Int. Cl.
*G06F 9/455* (2018.01)
*G06F 11/14* (2006.01)
*G06F 11/30* (2006.01)

(52) U.S. Cl.
CPC ...... *G06F 9/45558* (2013.01); *G06F 11/1448* (2013.01); *G06F 11/1471* (2013.01);
(Continued)

(58) Field of Classification Search
CPC ....... G06F 9/45558; G06F 2009/45562; G06F 2009/45575; G06F 2009/45583;
(Continued)

(56) References Cited

U.S. PATENT DOCUMENTS

| | | | |
|---|---|---|---|
| 6,795,966 B1 * | 9/2004 | Lim ............ | G06F 11/1438 718/1 |
| 8,499,297 B2 * | 7/2013 | Chen ........... | G06F 11/1484 718/1 |

(Continued)

FOREIGN PATENT DOCUMENTS

| | | | | |
|---|---|---|---|---|
| EP | 1024430 A2 * | 8/2000 | ......... | G06F 11/1482 |
| WO | WO-2020109843 A1 * | 6/2020 | ......... | G06F 9/5061 |

OTHER PUBLICATIONS

International Search Report and Written Opinion of the International Searching Authority dated Jul. 9, 2024 in connection with International Patent Application No. PCT/US2024/019835, 9 pages.

(Continued)

*Primary Examiner* — Lewis A Bullock, Jr.

(57) ABSTRACT

A method includes executing replicated virtual machines on multiple computing nodes within a cluster in a distributed computing network. Each virtual machine includes an application, and the application includes bytecode. The method also includes sequentially recording, in a replicated transaction log, transactions of the virtual machines and one or more upgrades to the bytecode. The method further includes generating, for each computing node, one or more snapshots and truncating the transaction log. Each snapshot captures an application state and the bytecode of the associated virtual machine. In addition, the method includes, in response to restoration of at least one computing node in the cluster or an addition of at least one additional computing node to the cluster, restoring one or more virtual machines (Continued)

to a current application state of one or more other virtual machines using the transaction log and at least one of the one or more snapshots.

21 Claims, 5 Drawing Sheets

(52) U.S. Cl.
CPC ...... *G06F 11/1474* (2013.01); *G06F 11/1484* (2013.01); *G06F 11/1492* (2013.01); *G06F 11/301* (2013.01); *G06F 2009/45562* (2013.01); *G06F 2009/45575* (2013.01); *G06F 2009/45583* (2013.01)

(58) Field of Classification Search
CPC ............. G06F 11/1448; G06F 11/1471; G06F 11/1474; G06F 11/1484; G06F 11/1492; G06F 11/301
See application file for complete search history.

(56) References Cited

U.S. PATENT DOCUMENTS

| | | | | |
|---|---|---|---|---|
| 8,819,369 | B1* | 8/2014 | Alappat | G06F 11/1484 718/1 |
| 9,223,610 | B2* | 12/2015 | Kalmbach | G06F 9/453 |
| 10,067,692 | B2* | 9/2018 | Liu | G06F 3/0664 |
| 10,146,471 | B1* | 12/2018 | Samad | G06F 3/0664 |
| 10,503,612 | B1* | 12/2019 | Wang | G06F 11/2023 |
| 11,074,153 | B2* | 7/2021 | Nelson | G06F 9/45558 |
| 11,768,809 | B2* | 9/2023 | Jaltade | G06F 16/184 707/609 |
| 11,888,599 | B2* | 1/2024 | Gupta | H04L 69/40 |
| 2006/0271931 | A1* | 11/2006 | Harris | G06F 9/526 718/1 |
| 2007/0271428 | A1* | 11/2007 | Atluri | G06F 11/1451 714/E11.122 |
| 2010/0107158 | A1* | 4/2010 | Chen | G06F 11/1484 718/1 |
| 2012/0191908 | A1* | 7/2012 | North | G06F 11/2097 711/112 |
| 2012/0323853 | A1* | 12/2012 | Fries | G06F 11/301 707/649 |
| 2013/0024722 | A1* | 1/2013 | Kotagiri | G06F 3/065 714/6.1 |
| 2014/0165056 | A1* | 6/2014 | Ghai | G06F 11/202 718/1 |
| 2014/0258235 | A1* | 9/2014 | Jin | G06F 11/1438 707/639 |
| 2014/0258238 | A1* | 9/2014 | Jin | G06F 9/45558 707/649 |
| 2015/0212896 | A1* | 7/2015 | Pawar | G06F 16/128 707/648 |
| 2018/0276085 | A1* | 9/2018 | Mitkar | G06F 3/065 |
| 2019/0220444 | A1 | 7/2019 | Guo et al. | |
| 2019/0243725 | A1* | 8/2019 | Bade | G06F 11/2025 |
| 2019/0332498 | A1* | 10/2019 | Mallik | G06F 9/45558 |
| 2020/0026618 | A1* | 1/2020 | Bansal | G06F 9/45558 |
| 2020/0310942 | A1* | 10/2020 | Nelson | G06F 9/45508 |

OTHER PUBLICATIONS

Bera et al., "Sista: Saving Optimized Code in Snapshots for Fast Start-Up", HAL Open Science, Sep. 2017, 14 pages.
Adya et al., "Fast key-value stores: An idea whose time has come and gone", May 2019, 7 pages.
Wikipedia, "Object-relational impedance mismatch", Nov. 2022, 14 pages.
Ongaro et al., "In Search of an Understandable Consensus Algorithm", 2014 USENIX Annual Technical Conference, Jun. 2014, 16 pages.
Etcd.io, "FAQ—Frequently Asked Questions: etcd, General", Aug. 2021, 10 pages.
HashiCorp Developer, "What is Consul", Nov. 2022, 6 pages.
Dgraph, "Dgraph Database Overview", 2023, 6 pages.
Bagwell, "Ideal Hash Trees", Eighth Annual ACM-SIAM Symposium on Discrete Algorithms, 1997, 19 pages.
Cockroach Labs, "CockroachDB FAQs | CockroachDB Docs", Nov. 2022, 8 pages.
Erlang, "Erlang/OTP System Documentation", Oct. 2022, 398 pages.
Erlang, "Erlang—gen_server", Nov. 2022, 39 pages.
Erlang, "Erlang—Release Handling", Nov. 2022, 15 pages.
Github, "lleo/go-hamt: Go implementation of a Hash Array Map Trie", Nov. 2022, 4 pages.
Neward, "The Vietnam of Computer Science", Ted Neward's Blog, Jun. 2006, 45 pages.
Cortesi, "A Farewell to ORMs", Oct. 2009, 5 pages.
Armstrong, "My Favorite Erlang Program", Nov. 2013, 3 pages.
Leclaire, "A Surprising Feature of Golang that Colored Me Impressed", Apr. 2014, 5 pages.

* cited by examiner

SYSTEM AND METHOD SUPPORTING HIGHLY-AVAILABLE REPLICATED COMPUTING APPLICATIONS USING DETERMINISTIC VIRTUAL MACHINES

TECHNICAL FIELD

This disclosure is generally directed to computing systems. More specifically, this disclosure is directed to a system and method supporting highly-available replicated computing applications using deterministic virtual machines.

BACKGROUND

Many computing applications today are implemented in cloud-based computing systems or other distributed computing systems. These types of approaches can support the use of high-availability (HA) computing applications. For example, multiple computing nodes in a distributed computing system can be used to execute multiple instances of the same computing application. This can help to ensure that the computing application remains available for use, such as by client devices or other devices, in the event that one or some of the computing nodes fail or suffer from other faults.

SUMMARY

This disclosure relates to a system and method supporting highly-available replicated computing applications using deterministic virtual machines.

In a first embodiment, a method includes executing replicated virtual machines on multiple computing nodes within a cluster in a distributed computing network. The virtual machines include an application that is executed by the multiple computing nodes, and the application of each virtual machine includes bytecode. The method also includes sequentially recording, in a replicated transaction log used by the virtual machines, transactions of the virtual machines and one or more upgrades to the bytecode of the application. The method further includes generating, for each of the computing nodes, one or more snapshots and truncating the replicated transaction log, where each snapshot captures an application state and the bytecode of the associated virtual machine. In addition, the method includes, in response to restoration of at least one of the computing nodes in the cluster or an addition of at least one additional computing node to the cluster, restoring one or more of the virtual machines to a current application state of one or more others of the virtual machines using the transaction log and at least one of the one or more snapshots.

In a second embodiment, a system includes multiple computing nodes configured to execute replicated virtual machines within a cluster in a distributed computing network. The multiple computing nodes are configured to execute an application of the virtual machines, and the application of each virtual machine includes bytecode. Each computing node, when executing the associated virtual machine, is configured to sequentially record, in a replicated transaction log used by the virtual machines, transactions of the virtual machine and one or more upgrades to the bytecode of the application. Each computing node, when executing the associated virtual machine, is also configured to generate, for the computing node, one or more snapshots and truncate the replicated transaction log, where each snapshot captures an application state and the bytecode of the associated virtual machine. In response to restoration of at least one of the computing nodes in the cluster or an addition of at least one additional computing node to the cluster, at least one of the computing nodes is configured to restore one or more of the virtual machines to a current application state of one or more others of the virtual machines using the transaction log and at least one of the one or more snapshots.

In a third embodiment, a non-transitory computer readable medium contains instructions that when executed cause each of multiple computing nodes to execute a replicated virtual machine within a cluster in a distributed computing network. The virtual machine includes an application that is executed by the computing node, and the application includes bytecode. The non-transitory computer readable medium also contains instructions that when executed cause each of the computing nodes to sequentially record, in a replicated transaction log used by the virtual machines, transactions of the virtual machine and one or more upgrades to the bytecode of the application. The non-transitory computer readable medium further contains instructions that when executed cause each of the computing nodes to generate one or more snapshots and truncate the replicated transaction log, where each snapshot captures an application state and the bytecode of the virtual machine. In addition, the non-transitory computer readable medium contains instructions that when executed cause each of the computing nodes, in response to restoration of the computing node, to restore the virtual machine to a current application state of one or more others of the virtual machines using the transaction log and at least one of the one or more snapshots.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
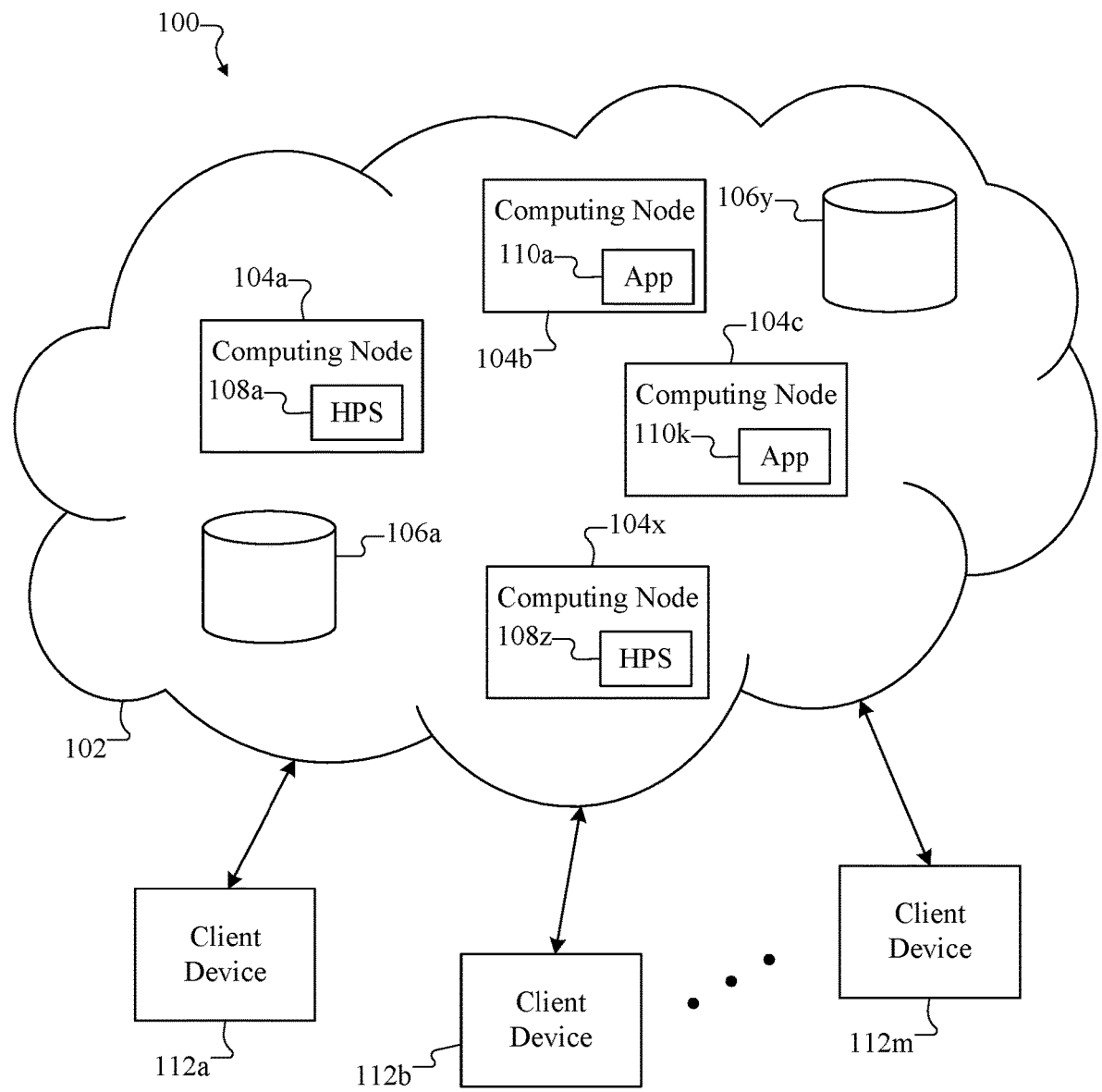
FIG. 1 illustrates an example system supporting highly-available replicated computing applications using deterministic virtual machines according to this disclosure.

FIGS. 1 through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, many computing applications today are implemented in cloud-based computing systems or other distributed computing systems. These types of approaches can support the use of high-availability (HA) computing applications. For example, multiple computing nodes in a distributed computing system can be used to execute multiple instances 10 of the same computing application. This can help to ensure that the computing application remains available for use, such as by client devices or other devices, in the event that one or some of the computing nodes fail or suffer from other faults.

Unfortunately, actually providing high-availability computing applications in distributed computing systems can involve overcoming a number of difficulties. For example, many modern high-availability computing architectures use stateless applications that communicate with highly-available stateful databases. However, in these types of approaches, high processing overheads are typically incurred due to object serialization and deserialization as data is passed between stateful services and stateless applications and translated into useable representations. Also, there is increased delay (latency) in these approaches since data passes across a network between the stateful services and the stateless applications. In addition, there is a tendency in these approaches to read and transfer more data than is actually required by the stateless applications, which can increase network congestion and slow operations.

Providing high-availability computing applications in distributed computing systems also typically requires that a number of additional functions be provided in order to enable the use of multiple computing nodes executing different instances of the same application. For example, since it is unknown when one or more computing nodes might fail or otherwise experience runtime errors, there is typically a need to maintain consistency of application states across various computing nodes in the event of runtime errors. In many cases, this is achieved by capturing the current states of the applications being executed (referred to as "snapshotting") and providing the ability to restore applications based on captured snapshots when existing computing nodes fail and recover or when new computing nodes are used to execute an application. However, many snapshotting techniques may involve freezing execution of the applications so that snapshots can be captured, which interrupts operation of the applications.

Moreover, multiple computing nodes may read and write data to and from the same databases, and there is typically a need to implement read and write locking strategies, such as to avoid situations where one application is attempting to write data values that another application is attempting to read. Further, in some use cases, there may be a need for multiple instances of the same application being executed to agree with one another, such as when the multiple instances of the application are used to process the same data and are expected to produce the same results. As a result, the application may need to support only deterministic operations so that all instances of the application operate in the same way each time they are presented with the same data. In addition, there typically need to be mechanisms for administering and otherwise controlling the distribution and execution of application instances on computing nodes and for managing side-effects of the applications executions. All of these aspects can complicate design and programming efforts involving the development of new or improved applications. Among other things, these issues can raise barriers to the entry of new or improved applications into the marketplace, increase the amount of coding needed to develop new or improved applications, create more numerous opportunities for mistakes, and increase development costs.

This disclosure provides various techniques supporting highly-available replicated computing applications using deterministic virtual machines. As described in more detail below, this disclosure provides a programming framework and runtime environment that allow users to build high-performance highly-available distributed computing applications through the replication of deterministic virtual machines. For example, the programming framework and runtime environment can be used to write and execute principled, high-performance, fault-tolerant computing applications. Among other things, this can be achieved by transparently replicating virtual machines that host one or more applications in order to achieve higher availability. The virtual machine replicas can be designed to be both available and consistent with each other. The disclosed techniques use functional programming principles to ensure that useful complex applications can be replicated safely and effectively. Further, the disclosed techniques offer a way for programmers to write performant fault-tolerant applications in a natural style. Features that are available for use by applications executed using the replicated virtual machines can be restricted in order to favor determinism over computing power In other words, the features that can be used by the applications may be restricted in order to help ensure that the replicas of the virtual machines are and remain consistent with each other over time.

In some embodiments, virtual machines can be replicated across any suitable number of computing nodes and clustered using the RAFT protocol or other consensus protocol for managing replicated logs. These types of protocols can be used to present a replicated log to multiple virtual machines in a cluster. By processing log entries deterministically and in order as defined by the log, the virtual machines in the cluster arrive at the same end state, which is a process that may be referred to as state machine replication. As described below, the disclosed techniques can replicate both application code and application states using transaction logs. For instance, when a new computing node comes online or an existing computing node is restored after a fault, a virtual machine on that computing node can be updated to the current state of other virtual machines by having the computing node process or "replay" the events in a transaction log. When application code upgrades are included in the transaction log, this can ensure that the computing node uses the correct code to process the events in the transaction log. This helps to avoid issues with prior approaches where older events might conceivably be replayed using newer code during recovery, which could lead to changes in history or cause replica divergence. When considering these challenges, it may seem appealing to move most of the application logic outside of a state machine and simply employ the state machine as a "dumb" state store for smart stateless external applications. However, this type of approach typically incurs higher costs for data access since multiple round-trips may be required to perform a single application operation, which can create performance and transaction isolation problems. Also, a public application programming interface (API) between the state machine and the application would need to grow in order to service all reasonable data access patterns. The disclosed techniques help to avoid these types of issues.

When designing an application based around state machine replication, programmers often make choices about how much logic should be placed inside a state machine and how much logic should be moved outside the state machine. Due to determinism constraints, the disclosed techniques can support input/out (I/O)) functions, time-related functions, identifier (ID) generation functions, or other non-deterministic functions outside of replicated virtual machines. This can help to ensure that the applications themselves remain deterministic, even if certain operations associated with the applications are not. In some cases, for example, a transaction log can be used to identify a non-deterministic operation to be performed An external component may be used to read the non-deterministic operation from the transaction log, initiate or perform the non-deterministic operation, and write the results of the non-deterministic operation back into the transaction log. At that point, the virtual machines can all consistently use the results as contained in the transaction log. This can help to ensure that all virtual machines see the same results from the same non-deterministic operations. This can also help to avoid situations where, for example, one virtual machine fails to get a response from an external data source or other component that halts processing while other virtual machines get a response from the external component and continue processing.

In this way, the disclosed programming framework and runtime environment help to reduce the cost, complexity, and specialized knowledge required to build high-performance highly-available distributed applications. The disclosed programming framework and runtime environment allow software engineers or other personnel to write principled, high performance, fault-tolerant computing applications without having to deal with many of the lower-level details associated with high-availability engineering. In some instances, the applications can be free from side-effects, and programmers may only be concerned with the business logic or state management portions of an application. Also, in some cases, the programming framework can be used in conjunction with mainstream languages like JAVA, GOLANG, or PYTHON, which can facilitate easier adoption of the programming framework. The disclosed techniques allow programmers to focus on higher-level functionalities while hiding lower-level complexities, guaranteeing determinism, and making code upgrades simple and safe. This can result in higher performance, improved developer ergonomics, and reduced architectural complexities in the applications.

Moreover, the described techniques allow for co-location of application logic and state information, which can help to avoid a number of problems associated with prior approaches. For instance, computationally-expensive read-modify-write operations involving remote databases can be replaced with cheaper local modifications, and a public data access API can be maintained at a more appropriate size (such as the minimum size actually required). This reduces the surface area of externally-available application states and can have positive effects on maintainability and security. Also, the described techniques can help to reduce impedance mismatches by allowing data models to be tailored to the particular problems at hand for specific applications. In addition, native data structures and an expressiveness that approaches that of general-purpose programming languages can remove the need for object-relational (ORM) mappings, making it easier for programmers or other personnel to develop data representations that are both natural and highly performant.

FIG. 1 illustrates an example system 100 supporting highly-available replicated computing applications using deterministic virtual machines according to this disclosure. As shown in FIG. 1, the system 100 includes a distributed computing network 102, such as a cloud-based computing system or other distributed computing system. In this example, the distributed computing network 102 includes a number of computing nodes 104a-104x and a number of databases 106a-106y. Each computing node 104a-104x represents a computing device that can perform various data processing operations or other operations to support the execution of various applications (such as by using virtual machines as discussed below). Each computing node 104a-104x represents any suitable computing or other data processing device or system, such as a server. The distributed computing network 102 can include any suitable number of computing nodes 104a-104x. In some cases, the distributed computing network 102 may include an extremely large number of computing nodes, such as thousands, tens or hundreds of thousands, or millions of computing nodes.

The databases 106a-106y represent data storage and retrieval components that can be used in the distributed computing network 102 to store virtual machines, data processed by the virtual machines, results generated by the virtual machines, snapshots of virtual machine application states, or other information. Each database 106a-106y may store information in any suitable manner, and each database 106a-106y may store any suitable amount of information. In many embodiments, multiple databases 106a-106y are redundant with respect to each other, meaning these databases 106a-106y can store the same data in case one or more of the databases 106a-106y fail. The distributed computing network 102 can include any suitable number of databases 106a-106y.

Each of the computing nodes 104a-104x may be used to execute any suitable applications. In this example, the computing nodes 104a-104x are used to execute multiple instances of a high-performance scheduler 108a-108z and multiple instances of one or more additional applications 110a-110k. Each instance of the high-performance scheduler 108a-108z controls which applications 110a-110k are executed by the computing nodes 104a-104x and which computing nodes 104a-104x are used to execute the applications 110a-110k. For example, each instance of the high-performance scheduler 108a-108z can be used to identify which applications 110a-110k need to be executed and how many instances of each application 110a-110k need to be executed. This can be based on various factors, such as demand for each application 110a-110k. Each instance of the high-performance scheduler 108a-108z can also cause the appropriate virtual machines hosting the applications 110a-110k to be retrieved by the appropriate computing nodes 104a-104x and control when the computing nodes 104a-104x execute the virtual machines. Each instance of the high-performance scheduler 108a-108z can further detect failures of computing nodes 104a-104x and compensate for such failures, such as by having virtual machines loaded onto and executed by replacement computing nodes 104a-104x.

Each additional application 110a-110k may represent any suitable application to be executed. The functionality or functionalities of the additional applications 110a-110k can easily vary based on the use cases. In many instances, each additional application 110a-110k can represent an application where high availability is needed or desired, such as when at least one instance of each additional application 110a-110k needs to be available twenty-four hours a day, seven days a week, fifty-two weeks a year. A similar requirement may affect the high-performance schedulers 108a-108z since at least one high-performance scheduler 108a-108z typically needs to be available at any given time to ensure that the additional applications 110a-110k can be loaded onto and executed by the appropriate computing nodes 104a-104x. Each additional application 110a-110k may be hosted on and executed by any suitable number of computing nodes 104a-104x. For both the high-performance schedulers 108a-108z and the additional applications 110a-110k, the computing nodes 104a-104x and the number of computing nodes 104a-104x being used to execute the high-performance schedulers 108a-108z or the additional applications 110a-110k may change over time.

The computing nodes 104a-104x and databases 106a-106y often communicate with each other via high-speed networks or other communication links. This allows the various components of the distributed computing network 102 to interact and exchange information in support of the various data processing operations and other operations being performed in the distributed computing network 102.

In this example, various client devices 112a-112m can interact with the distributed computing network 102. For example, the client devices 112a-112m may represent computers or other electronic devices that may provide data to the distributed computing network 102 for processing and that may receive results of the data processing from the distributed computing network 102. As a particular example, each client device 112a-112m may execute one or more client applications, which can be used to provide data to one or more applications 110a-110k in the distributed computing network 102 and to receive and use data processing results from the one or more applications 110a-110k in the distributed computing network 102. The client devices 112a-112m may be used by individual users, users of organizations that need or want to use the data processing capabilities of the distributed computing network 102, or any other suitable entities (including other computing or electronic systems that can process or store the results of the data processing performed by the distributed computing network 102). Each client device 112a-112m represents any suitable computing or other electronic device.

Although FIG. 1 illustrates one example of a system 100 supporting highly-available replicated computing applications using deterministic virtual machines, various changes may be made to FIG. 1. For example, the system 100 may include any suitable number of computing nodes 104a-104x, databases 106a-106y, high-performance schedulers 108a-108z, applications 110a-110k, and client devices 112a-112m. Also, these components may be located in any suitable locations and might be distributed over a large area. In addition, while FIG. 1 illustrates one example operational environment in which highly-available replicated computing applications may be provided using deterministic virtual machines, this functionality may be used in any other suitable system.

Figure 2:
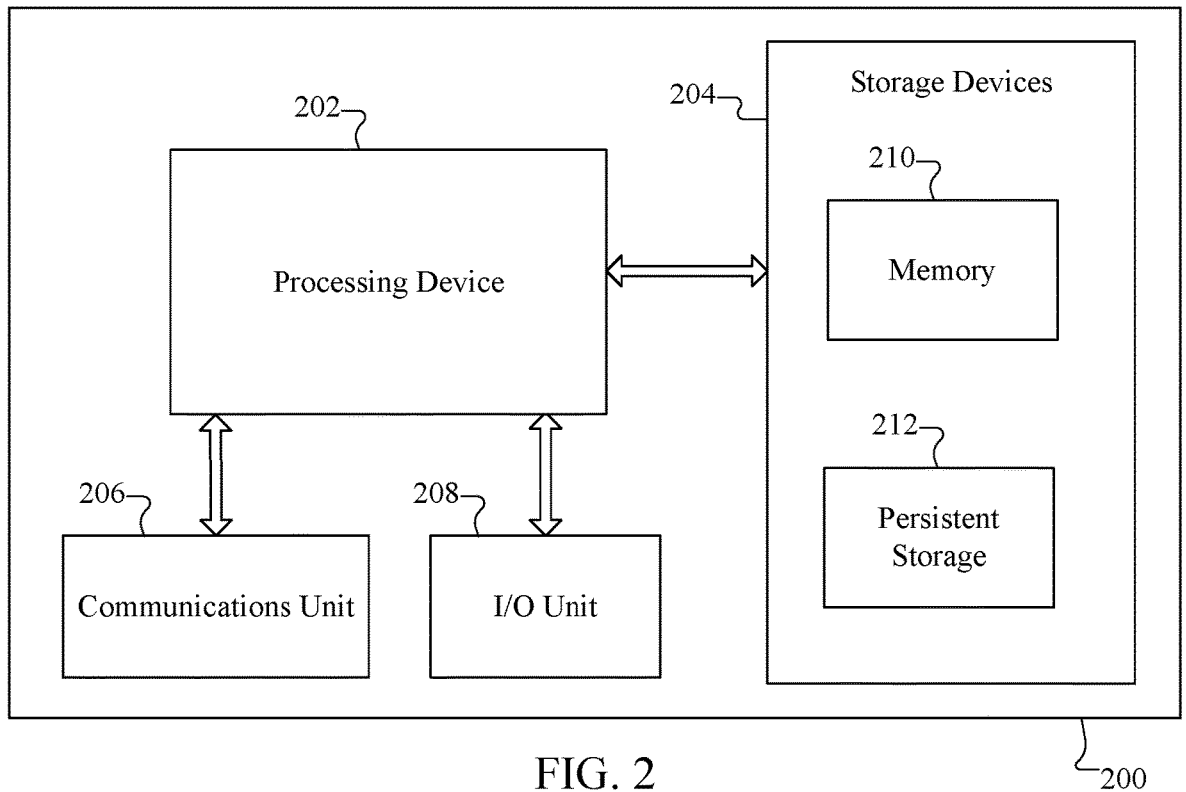
FIG. 2 illustrates an example device supporting highly-available replicated computing applications using deterministic virtual machines according to this disclosure.

FIG. 2 illustrates an example device 200 supporting highly-available replicated computing applications using deterministic virtual machines according to this disclosure. One or more instances of the device 200 may, for example, be used to at least partially implement the functionality of each of the computing nodes 104a-104x, databases 106a-106y, or client devices 112a-112m in FIG. 1. Note, however, that each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

Although FIG. 2 illustrates one example of a device 200 supporting highly-available replicated computing applications using deterministic virtual machines, various changes may be made to FIG. 2. For example, computing and communication devices and systems come in a wide variety of configurations, and FIG. 2 does not limit this disclosure to any particular computing or communication device or system.

Figure 3:
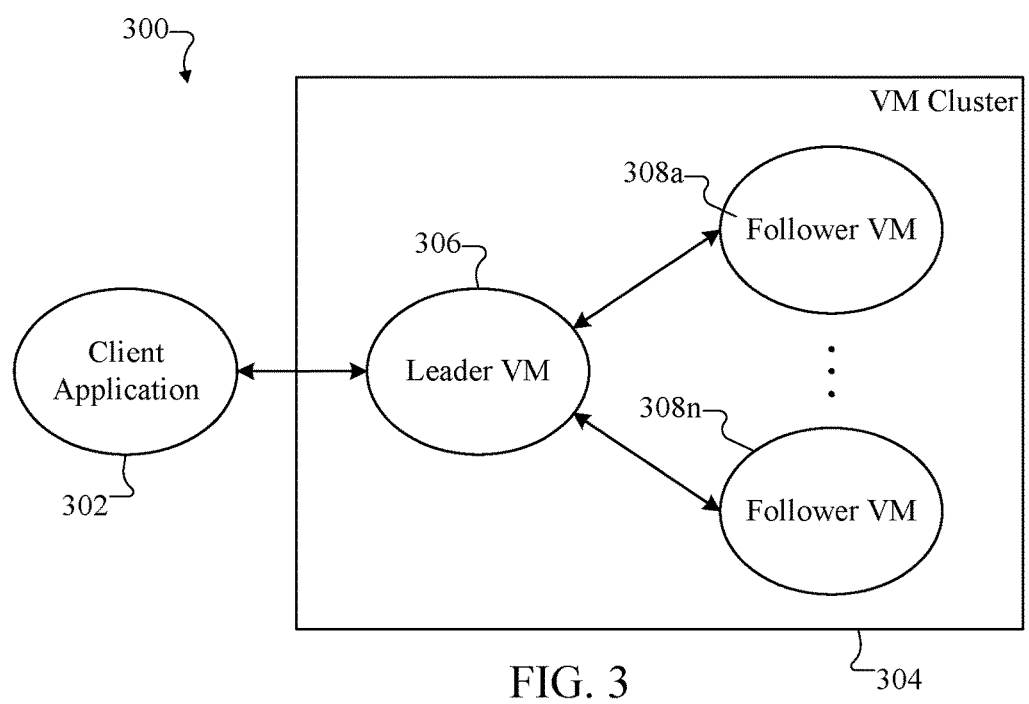
FIG. 3 illustrates an example functional approach for replication of deterministic virtual machines to support highly-available computing applications according to this disclosure.

FIG. 3 illustrates an example functional approach 300 for replication of deterministic virtual machines to support highly-available computing applications according to this disclosure. The functional approach 300 shown in FIG. 3 may, for example, be implemented using various computing nodes 104a-104x in the distributed computing network 102.

However, the functional approach 300 shown in FIG. 3 may be used with any other suitable devices and in any other suitable systems.

As shown in FIG. 3, a client application 302 can interact with a cluster 304 of virtual machines. For example, the client application 302 may be used to provide data to the cluster 304 for processing by the virtual machines and to receive the results of the processing from the cluster 304. As a particular example, the client application 302 may represent an application executed by one or more of the client devices 112a-112m. The data provided by the client application 302 and the results provided to the client application 302 can vary widely based on the application.

The cluster 304 of virtual machines here represents a collection of multiple virtual machines that can be used to process data or perform other operations. Each of the virtual machines in the cluster 304 can represent a replica of the same virtual machine. As a result, each of the virtual machines can perform the same functions and (when processing the same input data) can generate the same results. In this example, the virtual machines include a leader virtual machine 306 and multiple follower virtual machines 308a-308n. The leader virtual machine 306 may represent the virtual machine responsible for providing outputs to the client application 302, while the follower virtual machines 308a-308n may process the same data as the leader virtual machine 306 but not interact directly with the client application 302. Note that the cluster 304 may include any suitable number of follower virtual machines 308a-308n. The virtual machines 306, 308a-308n can be used to execute different instances of one or more applications (such as different instances of the high-performance scheduler 108a-108z or different instances of the same additional application 110a-110k), which allows for high-availability of the executed applications(s) since the application(s) can remain available even if one or some of the virtual machines 306, 308a-308n become unavailable (such as due to failure of the associated computing node(s)).

In some embodiments, each virtual machine 306, 308a-308n can be implemented as a bytecode interpreter, such as a bytecode interpreter written in the Go programming language. In some embodiments, the bytecode implementing an application to be executed by each virtual machine 306, 308a-308n can be generated by compiling source code or other code in order to produce the corresponding bytecode. Note, however, that the bytecode can be generated in any other suitable manner. The instruction set, features, and data types that can be used to produce the bytecode can be restricted, such as in the various ways discussed below, to help ensure that the virtual machines 306, 308a-308n are deterministic when executing the bytecode. This allows one or more applications executed by the virtual machines 306, 308a-308n to be written in an event-driven and purely-functional style.

Virtual machines within the distributed computing network 102 (including the virtual machines 306, 308a-308n shown in FIG. 3) can be clustered into various clusters 304 to support the execution of multiple instances of different applications. For example, there may be one cluster 304 of computing nodes 104a-104x executing the high-performance scheduler and another cluster of computing nodes 104a-104x executing each additional application. In some cases, a computing node 104a-104x may execute multiple virtual machines, so that computing node 104a-104x may form part of multiple clusters 304.

The virtual machines can be clustered and used in the clusters 304 in any suitable manner. For example, in some embodiments, the computing nodes 104a-104x or their associated virtual machines may use the RAFT protocol or other consensus protocol. The use of a consensus protocol allows each cluster 304 of virtual machines to form a consensus regarding the state of a hosted application. As noted above, the consensus protocol can support the use of a transaction log, which can be replicated among the virtual machines of each cluster 304 and used in various ways (including those described below). One unique feature that can be used here is that application bytecode can be stored in the transaction log along with events, which can help to ensure that events in the transaction log are processed using the correct application bytecode.

While clustering using the RAFT protocol or other consensus protocol can help to simplify the creation and use of multiple instances of an application, clustering protocols tend to involve lower-level functions. Many details (such as those related to snapshotting and restoration, read and write locking strategies, determinism, virtual machine administration, and side-effects management) are left to programmers of the application to be replicated. These details are quite removed from the programmers' core problems, but they typically need to be addressed in order to effectively employ the RAFT protocol or other consensus protocol successfully. The following features of this disclosure can therefore be used to help shield programmers or other personnel from these issues.

The virtual machines 306, 308a-308n used in each cluster 304 can support the use of a restricted set of specified data types. For example, in some cases, the virtual machines 306, 308a-308n can support the use of signed integers, strings, tuples, lists, and maps. User-defined data types may or may not be supported depending on the implementation. The data typing system used here may be dynamic, and tuples, lists, and maps may contain mixed types. All data values of these specified data types can be immutable. That is, rather than allowing changes to the values of the data types, any attempt to modify a data value of any specified data type can produce a new data value (while leaving the prior data value untouched). In some embodiments, efficiency can be achieved by using functional-style persistent data structures. In particular embodiments, lists may be implemented in an immutable LISP style, and values may be prepended to lists using the cons function (appending to lists may or may not be supported). Also, in particular embodiments, maps may be immutable and can be based on hash array mapped tries, where operations like put, get, and delete yield new maps without modifying the original maps.

The virtual machines 306, 308a-308n used in each cluster 304 can also support well-defined entry points that support interactions with the virtual machines 306, 308a-308n. In some embodiments, for example, each virtual machine 306, 308a-308n can implement four functions related to the well-defined entry points. These four functions are referred to as HandleUpgrade, HandleRequest, HandleQuery, and HandleStream functions and define the public interface for the associated virtual machine 306, 308a-308n. In some cases, these entry points can be exposed using a remote produce call (RPC) protocol, such as gRPC, which allows these functions to be invoked remotely.

The HandleUpgrade function can be used to upgrade the bytecode that is executed by a virtual machine 306, 308a-308n. In some cases, this function can be defined as follows.

$$\text{handle\_upgrade(old\_state)} \rightarrow \text{new\_state}$$

The HandleUpgrade function can be invoked whenever new bytecode needs to be loaded into a virtual machine. As noted above and described in more detail below, the new bytecode can be loaded via a transaction log. In some cases, the new bytecode can be provided to a handler, which can perform any needed transformation to an older application state and return a new transformed state that is compatible with the newly-loaded bytecode version. If errors are encountered during the upgrade process, the bytecode and the application state can be rolled back to their previous versions (they can succeed or fail atomically), and rollback can be guaranteed since the older states are immutable and remain unmodified by the upgrade transformation function in the transaction log. In some embodiments, bytecode upgrades may replace an entire program executed by a virtual machine, and there may or may not be support for dynamic linkage.

The HandleRequest function can be used for each request provided to a virtual machine 306, 308a-308n. In some cases, this function can be defined as follows.

handle_request(request_message,old_state)→{response,new_state}

The HandleRequest function accepts a request message and a current application state, and the HandleRequest function returns a two-tuple containing a response and a new application state. As noted above and described in more detail below, request messages can be serialized into a transaction log and processed in order by each virtual machine 306, 308a-308n. A response for each request message can be serialized and transferred to the caller (the device or application that sent the request message), while the new application state may be stored in the virtual machine 306, 308a-308n and not transferred across a network. If errors are encountered while handling a request, the application state can be rolled back to the previous version (the prior application state), and rollback can be guaranteed since the older application state is immutable and remains unmodified by the request handling function. The HandleRequest function can also be used for providing read-after-write, read-after-update, and read-after-delete consistency. In some cases, the HandleRequest function can return an unmodified older application state, and read-after-write, read-after-update, and read-after-delete requests may not be distinguished from write requests. This means that these read requests can block subsequent write requests, although this is not necessarily required. By definition, write requests can block subsequent read-after-write, read-after-update, and read-after-delete requests.

The HandleQuery function is invoked for stale read requests, which refer to read requests that do not involve the current application state. In some cases, this function can be defined as follows.

handle_query(query_message,old_state)→response

Stale read requests can bypass a transaction log entirely and may return out-of-date results based on older versions of older application states. Queries can be handled by any replica virtual machine (such as any virtual machine in a cluster 304), may not grow the transaction log, and may not have to be provided via the leader virtual machine 306. Consequently, stale read queries can be scaled in proportion to the size of the cluster 304. Since older application states are immutable, read queries can take a snapshot view of an older application state with virtually no processing or memory overhead. In some cases, queries can be run in a separate thread of control, stale read queries may not block write requests, and write requests may not block stale read queries. Code upgrades can also run concurrently with stale read requests. This results in a system with extremely-high read availability.

The HandleStream function is invoked for streaming read requests, which refer to longer-running read requests. In some cases, streaming read requests may continue concurrently with subsequent write operations and even bytecode upgrades. This means that a streaming read request may start before a bytecode upgrade and continue to completion without seeing the bytecode upgrade. The HandleStream function allows large result sets to be streamed to a caller with minimal memory overhead and without blocking subsequent write requests. Among other uses, the HandleStream function can be used if the read result set is too large to be returned in a single object or if partial results can be processed without waiting for the full read result set to arrive. Stale streaming requests can bypass a transaction log entirely and may return out-of-date results based on older versions of older application states. Stale streaming requests can be handled by any replica virtual machine (such as any virtual machine in a cluster 304), may not grow the transaction log, and may not have to be provided via the leader virtual machine 306. Consequently, stale streaming queries can be scaled in proportion to the size of the cluster 304. Since older application states are immutable, streaming read queries can take a snapshot view of an older application state with virtually no processing or memory overhead. In some cases, queries can be run in a separate thread of control, stale streaming queries may not block write requests, and write requests may not block stale streaming queries. Code upgrades can also run concurrently with stale streaming requests, so long-running streaming requests can run to completion without being interrupted by upgrades. Again, this results in a system with extremely-high read availability.

In these embodiments, the HandleRequest function can mark the boundary between two consecutive transactions. In some cases, all requests are guaranteed to be atomic, and runtime errors result in a rollback. This transaction style offers more flexible atomicity and consistency guarantees than many traditional key-value or document stores. Many state stores only offer atomic updates to a single document or a single key-value pair, while the described approach offers a transaction model that can be tailored to match each specific application's requirements. Also, in particular embodiments, all bytecode versions may be loaded via a hot-upgrade mechanism, which may be done to ensure determinism and preserve system availability. In addition, a single serialized write thread may be supported by each virtual machine 306, 308a-308n, so virtual machine upgrades can be easier to orchestrate and reason about compared to more general (and typically more powerful) multi-actor systems.

Also note that, in some embodiments, API function calls can support a clear ability to cleanly separate read and write operations. In the example above, for instance, the HandleQuery and HandleStream function calls may only be concerned with read-only operations, and the HandleRequest and HandleUpgrade function calls may only enable the changing of application states. These function calls, coupled with the pervasive use of immutable data structures, can help to ensure that a programmer is unable to express a mutation of an application state in read-only function calls Since read-only function calls receive immutable snapshots of application states, they can be run without blocking subsequent write requests, and subsequent write requests cannot interfere with ongoing read function calls. This can produce a number of benefits, such as (i) long-running read queries do not block write function calls, (ii) write function calls do not interfere with ongoing read function calls and there is no risk of "dirty" reads, and (iii) the system can be upgraded without interrupting ongoing read requests. In some embodiments, each read request is handled by a dedicated virtual machine, and new read virtual machines can be cloned from a write thread virtual machine. Also, bytecode can be shared between the write thread virtual machine and the cloned virtual machines. Virtual machines may be extremely cheap to create as module loading can be side-effect free, cloning a virtual machine may require no significant copying of state, and no complex initialization and very limited memory allocation may be needed.

Although FIG. 3 illustrates one example of a functional approach 300 for replication of deterministic virtual machines to support highly-available computing applications, various changes may be made to FIG. 3. For example, there may be any suitable number of clusters 304 of virtual machines in the distributed computing network 102, and each cluster 304 may include any suitable number of virtual machines. Also, the arrangement of the virtual machines in each cluster 304 may vary from the specific arrangement shown here, and different clusters 304 may have different arrangements of virtual machines. In addition, the specific data types and entry points described above are for illustration only, and other embodiments of the virtual machines may use other or additional data types or entry points.

Figure 4:
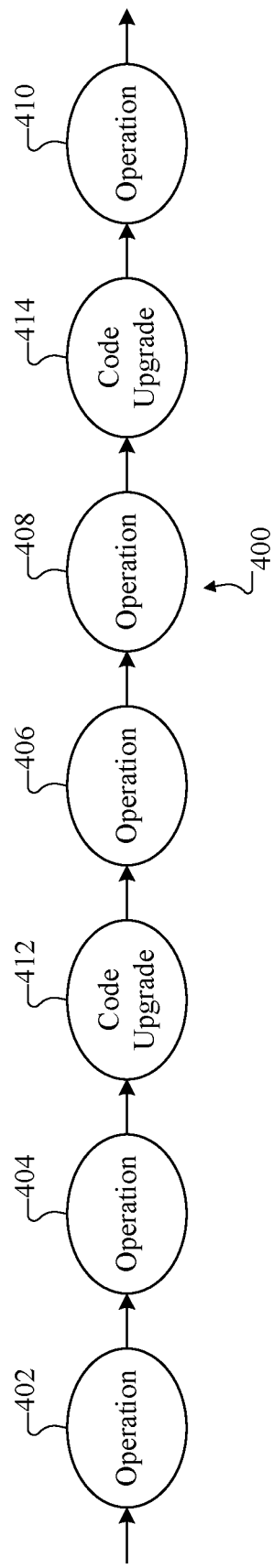
FIG. 4 illustrates an example transaction log for use with highly-available replicated computing applications according to this disclosure.

FIG. 4 illustrates an example transaction log 400 for use with highly-available replicated computing applications according to this disclosure. For example, the transaction log 400 may represent a transaction log that is replicated across all virtual machines 306, 308a-308n in a cluster 304. As shown in FIG. 4, the transaction log 400 contains a sequence of serial entries, which can be processed in order by each of the virtual machines 306, 308a-308n in the cluster 304. This can help to ensure that the virtual machines 306, 308a-308n remain deterministic and produce the same results when given the same sequence of serial entries in the transaction log 400.

In this example, the entries in the transaction log 400 include various operational entries 402-410 and optionally one or more bytecode upgrade entries 412-414. Each operational entry 402-410 can be associated with a received request that is processed by the virtual machines 306, 308a-308n of the cluster 304. For example, the operational entries 402-410 may be associated with HandleRequest invocations received by the virtual machines 306, 308a-308n. Each of the one or more bytecode upgrade entries 412-414 can be associated with a received bytecode upgrade that is processed by the virtual machines 306, 308a-308n of the cluster 304 in order to update the bytecode executed by the virtual machines 306, 308a-308n. For instance, the bytecode upgrade entries 412-414 may be associated with HandleUpgrade invocations received by the virtual machines 306, 308a-308n.

The transaction log 400 here can be replicated across all of the virtual machines 306, 308a-308n in a cluster 304. Also, each computing node 104a-104x hosting one of the virtual machines 306, 308a-308n in the cluster 304 can process the entries in its local transaction log 400 serially to reach an application state. If a computing node 104a-104x fails and recovers or a new computing node 104a-104x is added to the cluster 304, the virtual machine hosted by that computing node 104a-104x can process the entries in the transaction log 400 sequentially in order to reach the same application state as other virtual machines in the cluster 304. By replicating the transaction log 400 across multiple virtual machines 306, 308a-308n and by serializing the application bytecode used by the virtual machines into the copies of the transaction log 400, this can help to ensure that all replica virtual machines remain consistent and can help to guarantee determinism during log replays.

Although FIG. 4 illustrates one example of a transaction log 400 for use with highly-available replicated computing applications, various changes may be made to FIG. 4. For example, the number of operational entries 402-410, the number of bytecode upgrade entries 412-414, and the arrangement of the entries 402-414 are for illustration only and can easily vary based on the actual events occurring within the distributed computing network 102.

Figure 5:
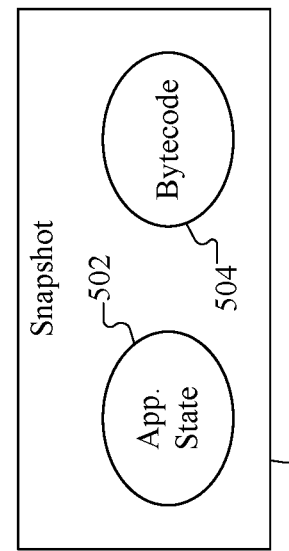
FIG. 5 illustrates an example snapshot for use with highly-available replicated computing applications according to this disclosure.

FIG. 5 illustrates an example snapshot 500 for use with highly-available replicated computing applications according to this disclosure. For example, the snapshot 500 may represent a snapshot that is captured of one of the virtual machines 306, 308a-308n in a cluster 304 during operation of the virtual machine. The same type of snapshot 500 can be captured for each of the virtual machines 306, 308a-308n in the cluster 304 and stored, such as in one or more databases 106a-106y.

As can be seen in the discussion of FIG. 4 above, the transaction log 400 provides a way for virtual machines to be restored or new virtual machines to be added to a cluster 304 and have their application states updated. This process involves replaying the entries in the transaction log 400, which is typically acceptable for transaction logs 400 of smaller sizes but unacceptable for transaction logs 400 of larger sizes. For example, it may take an excessively long period of time to process a transaction log 400 containing a billion entries during a log replay. The use of snapshots 500 can help to remedy this since a snapshot 500 captured at a specified time can represent the state of the virtual machine at that specified time, and the entries in the transaction log 400 prior to the specified time can be truncated from the transaction log 400. In order to restore the virtual machine or use a new replica of that virtual machine, the snapshot 500 can be used to initialize the virtual machine, and only the remaining entries in the transaction log 400 (which occurred after the specified time of the snapshot 500) may need to be replayed in order to update the virtual machine to the correct application state. This can help to prevent unbounded growth of the transaction log 400 and avoid long replay times.

As shown in FIG. 5, the snapshot 500 captures both an application state 502 of a virtual machine and application bytecode 504 used by the virtual machine at a specified time. The application state 502 can include all of the data values (such as signed integers, strings, tuples, lists, and maps) of the virtual machine at the specified time. By capturing both the application state 502 and the bytecode 504 at a particular time, entries in the transaction log 400 prior to that particular time can be truncated from the transaction log 400, and entries in the transaction log 400 after that particular time can be processed using the correct bytecode during subsequent replays of the transaction log 400. This is because the effects of the entries in the transaction log 400 prior to the particular time are captured using the snapshot 500.

Note that the generation of snapshots typically requires write blocking so that the virtual machines can capture a consistent view of their application states. Once this view has been captured, it can be serialized to stable storage, such as one or more databases 106a-106y. Since snapshotting blocks write operations, the state capture process typically needs to be as fast as possible in order to capture a snapshot without interfering with typical data processing operations or other operations being performed using the virtual machines. Some approaches for capturing snapshots use techniques such as multi-core parallelism and fast singlethreaded code, but this can have significant memory overhead and may cause noticeable application pauses during the capture process. Other approaches for capturing snapshots use a UNIX fork system call in order to capture a snapshot using a child process, which exploits the fork's copy-on-write behavior to make fast copies with low memory overhead, but this is not available in systems that lack forking capabilities (like WINDOWS systems).

In some embodiments, the virtual machines 306, 308a-308n can make use of the immutable data types supported by the virtual machines 306, 308a-308n to capture snapshots 500. That is, each virtual machine 306, 308a-308n has ready access to its full application state. In these embodiments, since data types used by the virtual machines 306, 308a-308n are immutable, data values are not overwritten. Rather, an attempt to modify a data value produces a new copy of that data value, leaving the prior data value untouched. Thus, it is possible for each virtual machine 306, 308a-308n to rapidly capture a snapshot 500 by identifying its data values at a specified time and using those data values to define the application state 502 of its snapshot 500. Any write operations that occur during the snapshotting can produce additional data values, but those additional data values can be ignored during the capture of the snapshot 500 at that time. As a result, snapshots 500 can be captured transparently, and application writers or other personnel do not need to deal with the lower-level details of state captures, file formats, serializations, and serialization versioning. The ubiquitous use of persistent immutable data structures means that the snapshots 500 are extremely fast and incur very little memory overhead. Moreover, queries can run concurrently with snapshots, which means that the system is always available for read requests. In addition, by capturing the bytecode 504 of each virtual machine along with its application state 502, each snapshot 500 helps to guarantee determinism during log replays.

Although FIG. 5 illustrates one example of a snapshot 500 for use with highly-available replicated computing applications, various changes may be made to FIGURE S. For example, a snapshot 500 may include any additional information as needed or desired depending on the particular implementation.

Figure 6:
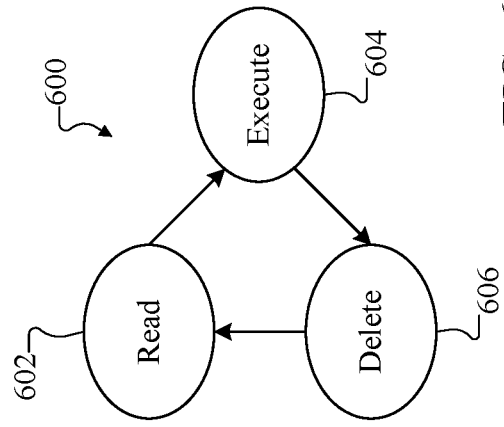
FIG. 6 illustrates an example effect processing cycle for use with highly-available replicated computing applications according to this disclosure.

FIG. 6 illustrates an example effect processing cycle 600 for use with highly-available replicated computing applications according to this disclosure. For example, the effect processing cycle 600 may be supported by the virtual machines 306, 308a-308n of a cluster 304 in order to support various interactions with external components. For example, as noted above, due to determinism constraints, some operations may be executed outside of the virtual machines 306, 308a-308n due to the non-deterministic nature of those operations. Specific examples of non-deterministic operations can include I/O functions (since it is unknown whether I/O operations will fail or take different amounts of time to complete), time-related functions (since it is unknown whether all virtual machines will measure time at exactly the same instant), ID generation functions (since different virtual machines can produce different results like different random numbers), or other non-deterministic functions. These types of operations may be generally referred to as "effectful operations," where performance of effectful operations results in the generation of desired "effects."

In some embodiments, the virtual machines 306, 308a-308n provide no direct mechanism for performing effectful operations. Instead, effectful operations are executed externally by an effectful subsystem, which in some embodiments may be implemented using one or more computing nodes 104a-104x (such as one or more computing nodes 104a-104x not executing the virtual machines). In some cases, the effectful subsystem may be written using a conventional general-purpose programming language, such as JAVA, GOLANG, or PYTHON. Interactions by the virtual machines 306, 308a-308n with the effectful subsystem may occur by recording intentions to perform interactions, which helps to support the effect processing cycle 600 shown in FIG. 6.

As shown in FIG. 6, when virtual machines need to perform an effectful operation, the virtual machines can write entries identifying an effect intention into their respective memories. The effect intention indicates that the virtual machines would have performed an effectful operation. For example, rather than reading data from a database, each virtual machine can record an intention to read the data from the database in an associated data structure in a memory. Ideally, the same intention should be recorded in the data structures for all virtual machines since the trigger that causes the need for the effectful operation should be identified by all virtual machines. Moreover, since the trigger that causes the need for the effectful operation can be recorded in the replicated transaction log 400, replaying of the transaction log 400 should cause all virtual machines to again record the same intention. In some cases, the recording of an intention may be initiated when a virtual machine issues a HandleRequest call, such as by using the RPC protocol.

In some embodiments, the effectful subsystem can make a read request 602 in order to obtain a list of pending effect intentions from the memory of at least one of the virtual machines (such as the leader virtual machine 306). For each pending effect intention, the effectful subsystem can perform or initiate the associated effectful operation during an execution operation 604. One or more effects associated with the executed effectful operation can be written into the transaction log 400 of at least one of the virtual machines (such as the leader virtual machine 306). If written into a single virtual machine's transaction log 400, the effect(s) would be replicated into the other virtual machines' transaction logs 400. The effectful subsystem can then delete the completed effect intention from the pending set of intentions during a delete operation 606. In some cases, communications related to deletions may "piggy-back" onto communications related to the next set of effectful operations to be performed, which can help reduce latency. In order to support this type of effect processing cycle 600, the virtual machines may include a library of useful data structures and functions for invocation by application writers or other personnel.

As a particular example of this functionality, assume multiple virtual machines 306, 308a-308n need to obtain data from an external data source (such as a database 106a-106y). In an ordinary system, each virtual machine would perform an I/O operation to request data from the external data source. This can easily increase network congestion since multiple virtual machines need to obtain the same data. Also, due to network issues or other issues, the I/O request from one or more virtual machines may be lost, the data from the data source sent to one or more virtual machines may be lost, the request or response may be delayed by an unknown amount of time, or any combination of these may occur. As a result, it would be relatively easy for different virtual machines to enter different application states and become desynchronized.

Using the approach described above, an effect intention (which can define an intent to read data from the external data source) can be recorded in the virtual machines' memories. The effectful subsystem can identify that effect intention, perform the desired read operation, and place the retrieved data in the virtual machines' transaction logs 400. Similar results can be obtained by having the effectful subsystem generate or otherwise obtain a random number or other identifier (which can be stored in the virtual machines' transaction logs 400 for use), by having the effectful subsystem perform or initiate performance of time-related functions, or by having the effectful subsystem perform other non-deterministic operations. As a result, the virtual machines remain deterministic even in the presence of non-deterministic operations.

Since effects are stored in the application states that are replicated in the transaction logs 400 (and captured by the snapshots 500), the effects are durable and can survive computing node losses and failovers. This can help to ensure that desired changes to the external world are completed as intended. Moreover, since effects are simply represented as data recorded in the replicated application states, I/O operations can be made transactional. If a runtime error is encountered during the recording of an I/O operation, the application state of each virtual machine can simply be rolled back, and no side-effects may be visible externally. In addition, separating the generation of effectful operation requests and the execution of the effectful operations themselves can facilitate easier testing of core business logic. The core logic of an application executed by the replicated virtual machines may be pure functional code, which can be tested without mocks, complex integration, or other machinery. This can lead to simpler programs, more extensive test coverage, and more correct applications.

Figure 7:
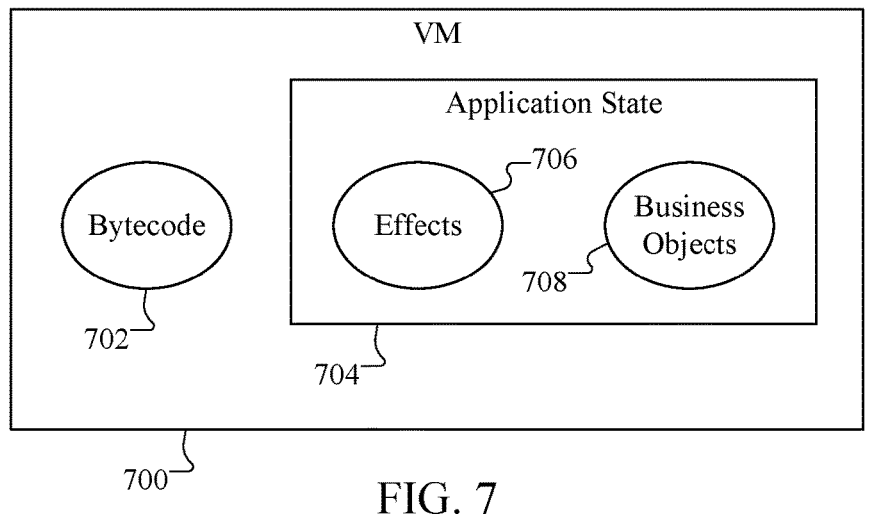
FIG. 7 illustrates an example replicated virtual machine state for use with highly-available replicated computing applications according to this disclosure.

FIG. 7 illustrates an example replicated virtual machine state 700 for use with highly-available replicated computing applications according to this disclosure. As shown in FIG. 7, bytecode 702 is executed by a virtual machine, and the virtual machine generates an application state 704 based on the execution of the bytecode 702. Using the approaches described above, effects 706 used by the virtual machine (and provided by one or more effectful subsystems) are separated from business logic represented by business objects 708. As a result, the business logic can be easily tested separate from the effects 706. By delegating the task of effect execution to traditional general-purpose programming languages, this approach allows application writers or other personnel to select the programming languages, tools, and libraries that best fit their needs. These languages, tools, and libraries do not need to be reimplemented to work with the virtual machines here.

Note that the effects provided by one or more effectful subsystems can be stored in any suitable data structure(s). In some cases, for example, each effect may have a corresponding unique identifier, which can make it easier to implement idempotent read and acknowledgement operations. Also note that effects do not need to be replayed during recovery, since new read requests 602 appear later in a transaction log 400 than previous read requests 602 and delete operations 606 (so an effectful subsystem cannot observe previously-deleted effects). In addition, note that "at-most-once" semantics can be achieved by removing an effect intention during the same transaction in which the effect intention is retrieved, while "at-least-once" semantics can be achieved by removing an effect intention after the effect intention has been completed. The appearance of "exactly-once" delivery can also be created, such as by using at-least-once semantics coupled with idempotency (if an effectful subsystem has already seen a message, it can ignore any subsequent retransmissions).

In some cases, it may be useful to delete an effect intention before an effectful subsystem executes the effect intention. For example, in a job execution system, it may be desirable to cancel a queued job before the job has run. However, if the job has been observed by an external effectful subsystem, it may already have been started (but may have not yet been deleted from the job queue). In this case, deleting the job may not be effective, and a kill message could be placed into the queue. In some embodiments, to facilitate such a cancellation, an "observed" bit may be added to each effect intention request that indicates whether the request has been observed by an external effectful subsystem. If the request has been observed (read), it cannot be cancelled from the queue. This technique may allow for late cancellation of scheduled effects and can reduce or prevent head-of-line blocking for some workloads.

Although FIG. 6 illustrates one example of an effect processing cycle 600 for use with highly-available replicated computing applications and FIG. 7 illustrates one example of a replicated virtual machine state 700 for use with highly-available replicated computing applications, various changes may be made to FIGS. 6 and 7. For example, virtual machines may support other effect processing cycles that include other or additional operations.

As noted above, the virtual machines 306, 308a-308n in each cluster 304 support deterministic operations so that the application states of the virtual machines generally remain consistent with one another. That is, the replicated virtual machines can be deterministic to help ensure that the replicas process the same data in the same manner to produce the same results. When using conventional programming techniques, programmers may need to be careful when performing I/O operations, upgrading code, generating identifiers, selecting data structures, etc. Some programming languages are positively hostile to writing deterministic programs. For example, the map key iteration order in GOLANG is actually randomized, not just undefined. In order to help ensure that determinism is achieved, the feature set supported by the virtual machines 306, 308a-308n may be restricted to deterministic operations, and the application bytecode executed by the virtual machines 306, 308a-308n can be placed into the replicated transaction log 400. This approach may seem counter-intuitive since it reduces the functionalities available to the virtual machines 306, 308a-308n. However, this approach helps to ensure that all functions performed by the virtual machines 306, 308a-308n are referentially transparent. Moreover, writing bytecode into the transaction log 400 helps to avoid replaying older transaction log entries using newer bytecode (which could lead to the creation of incorrect application states) and avoid problems where the final state of any replica virtual machine would depend on the index of the last snapshot 500.

Note that while the above description supports upgrading of the bytecode used by the virtual machines 306, 308a-308n via the replicated transaction log 400, there may be some instances where upgrading the virtual machine infrastructure itself is needed or desired. For example, it may become necessary or desirable to replace older virtual machines 306, 308a-308n with newer virtual machines 306, 308a-308n, such as to resolve security concerns or improve functionality. While maintaining perfect backwards compatibility may be ideal, it may not always be possible in practice, and infrastructure changes may require some system downtime to preserve determinism. In those cases, the following procedure might be used. An upgrade flag can be sent to the older virtual machines 306, 308a-308n through the replicated transaction log 400, where the upgrade flag suspends changes by the older virtual machines 306, 308a-308n. Client applications 302 attempting to use the application provided by the older virtual machines 306, 308a-308n may receive an error message that an upgrade is in progress and that their requests should be resubmitted after a suitable delay. Each of the older virtual machines 306, 308a-308n can process the upgrade message, capture a snapshot 500, and truncate its replicated transaction log 400. This helps to prevent the reprocessing of older requests using newer bytecode, and the snapshot 500 may contain the state of the upgrade flag. The older virtual machines 306, 308a-308n can be shut down, and the newer virtual machines 306, 308a-308n can be started. The upgrade flag can be cleared, and the newer virtual machines 306, 308a-308n can resume normal processing.

In terms of performance, the described approaches can achieve both good write performance and good read performance during operation of the virtual machines. With respect to write performance, all write operations can occur via the transaction log 400 as described above and can be processed in a single thread. While long-running write operations may be generally undesirable (as they block subsequent updates), the described approaches can achieve excellent performance. Among other reasons, the bytecode and the data are co-located, which greatly reduces the cost of data accesses. Also, the data can be stored in random access memory, which enables fast accesses. Moreover, since the HandleRequest function is purely computational, it may never need to wait on I/O operations, and write operations can be batched to minimize round-trips. Further, the use of immutable persistent data structures means that write operations can proceed concurrently with stale read operations or, more generally, that write operations may block read operations but read operations do not need to block write operations. In addition, it is possible to parallelize update operations by parallel mapping over data structures in order to reduce the time spent during each write operation.

With respect to read performance, read-after-write, read-after-update, and read-after-delete operations tend to be relatively expensive since they can enter the system via the transaction log 400 and incur resultant network round-trip penalties. In some cases, each stale read query can be run using a separate thread of control. A virtual machine can be cloned easily due to the use of immutable data structures, and the HandleQuery function can be executed using the closed virtual machine, which means that write operations can proceed concurrently with stale read queries. Also, in some cases, stale read queries can be processed using follower virtual machines 308a-308n, which allows the follower virtual machines 308a-308n to be scaled horizontally. Processing loads associated with stale read queries can be directed away from the leader virtual machine 306 to the follower virtual machines 308a-308n, such as by using a smart load balancer. This allows the leader virtual machine 306 to save its resources for dealing with write operations and read-after-write, read-after-update, and read-after-delete operations.

Note that while read-after-write, read-after-update, and read-after operations are described above as all being handled using the HandleRequest function, it is possible to separate these operations. This may allow, for example, the operations to run concurrently with other read operations and to run without blocking subsequent write operations. Also note that the results obtained using the virtual machines can be output in any suitable manner. In some embodiments, the virtual machines may support lazy result streaming, which (among other things) allows for streaming of very large result sets.

In some embodiments, the distributed application architecture described above can center around stateless applications communicating with stateful infrastructure services (such as via queues, service discovery registries, coordination services, etc.). Each of these services may require configuration, deployment, and monitoring, and each service introduces a potential for distributed system failures and distributed performance problems. In other embodiments, it is possible for developers or other personnel to embed these stateful services directly inside the applications that are executed using the virtual machines of the clusters 304, which can help to make the overall system architecture simpler and more reliable. As a particular example, in some cases, Infrastructure as a Library (IaaL) could be used to help simplify systems architectures.

In addition, in some cases, the virtual machines may be used to implement reconfigurable stateful compute functions. For example, in the ERLANG programming language, it is possible to create the following program.

```
universal_server( )->
    receive
        {become , F} -> F( )
    end
```

This program creates a "universal server" that waits for a "become" message encapsulating a function object. By executing this function, the universal server effectively becomes a new domain-specific program. One possible extension is that the domain-specific program may itself be a universal server. In some use cases, clusters of universal servers can be pre-staged and lazily assigned to specific purposes whenever needed. The virtual machines 306, 308a-308n can similarly be viewed as a type of universal server since the upgrade mechanism can be used to dynamically re-purpose stateful compute resources. This approach can lead to increased efficiencies or form part of interesting new computing architectures.

Figure 8:
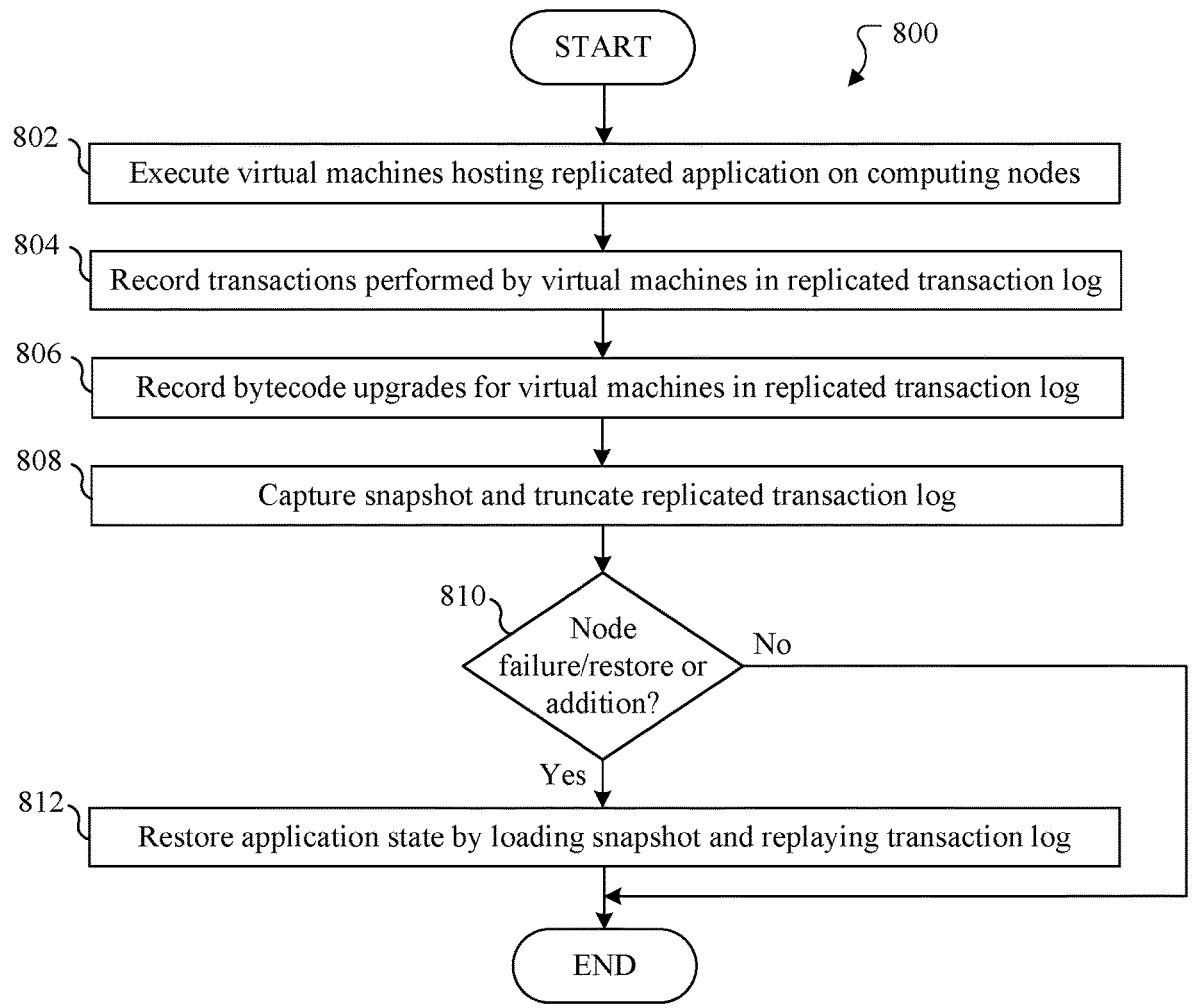
FIG. 8 illustrates an example method for supporting highly-available replicated computing applications using deterministic virtual machines according to this disclosure.

FIG. 8 illustrates an example method 800 for supporting highly-available replicated computing applications using deterministic virtual machines according to this disclosure. For ease of explanation, the method 800 is described as being performed using the virtual machines 306, 308a-308n of a cluster 304 within the distributed computing network 102 in the system 100 as shown in FIG. 1, where the virtual machines 306, 308a-308n can be executed by computing nodes 104a-104x each implemented using at least one device 200 as shown in FIG. 2. However, the method 800 may be performed using any other suitable devices in any other suitable systems.

As shown in FIG. 8, multiple virtual machines hosting a replicated application are executed on multiple computing nodes at step 802. This may include, for example, the processing devices 202 of different computing nodes 104a-104x executing the virtual machines 306, 308a-308n in a cluster 304. The virtual machines may implement a high-performance scheduler or other application. Because the virtual machines 306, 308a-308n can execute the same application, the virtual machines 306, 308a-308n provide the application with high availability. In some cases, at least one virtual machine 306, 308a-308n may be used to provide the application at any given time, permitting uninterrupted use of the application.

During execution of the virtual machines, transactions performed by the virtual machines are recorded in a transaction log at step 804. This may include, for example, the processing devices 202 of the computing nodes 104a-104x recording transactions performed by the virtual machines 306, 308a-308n in replicated copies of a transaction log 400. These transactions may be recorded as operational entries 402-410 in the replicated copies of the transaction log 400. Bytecode upgrades associated with the virtual machines are also recorded in the transaction log at step 806. This may include, for example, the processing devices 202 of the computing nodes 104a-104x recording the actual bytecode executed by the virtual machines 306, 308a-308n in the replicated copies of the transaction log 400. These upgrades may be recorded as bytecode upgrade entries 412-414 in the replicated copies of the transaction log 400. At each of one or more times, snapshots of the application states of the virtual machines can be captured and the replicated transaction log can be truncated at step 808. This may include, for example, the processing devices 202 of the computing nodes 104a-104x rapidly capturing snapshots 500 of the data values of immutable data structures used by the virtual machines 306, 308a-308n at one or more specified times. The snapshots 500 can also capture the bytecode being executed by the virtual machines. This may also include the processing devices 202 of the computing nodes 104a-104x truncating the transaction log 400 at each of the one or more specified times.

If a computing node fails and recovers or a new node is brought online in a cluster at step 810, the application state for a virtual machine on the recovered or new node is restored at step 812. This may include, for example, the processing device(s) 202 of the computing node 104a-104x that has recovered or been added to a cluster 304 loading the most recent snapshot 500 containing the application state of the replicated virtual machines. This may also include the processing device(s) 202 of the computing node 104a-104x that has recovered or been added replaying the entries in the transaction log 400 sequentially, processing the entries using the bytecode from the loaded snapshot 500 or any bytecode updates from the loaded snapshot 500 as appropriate to restore the virtual machine to the current application state of other virtual machines.

Figure 9:
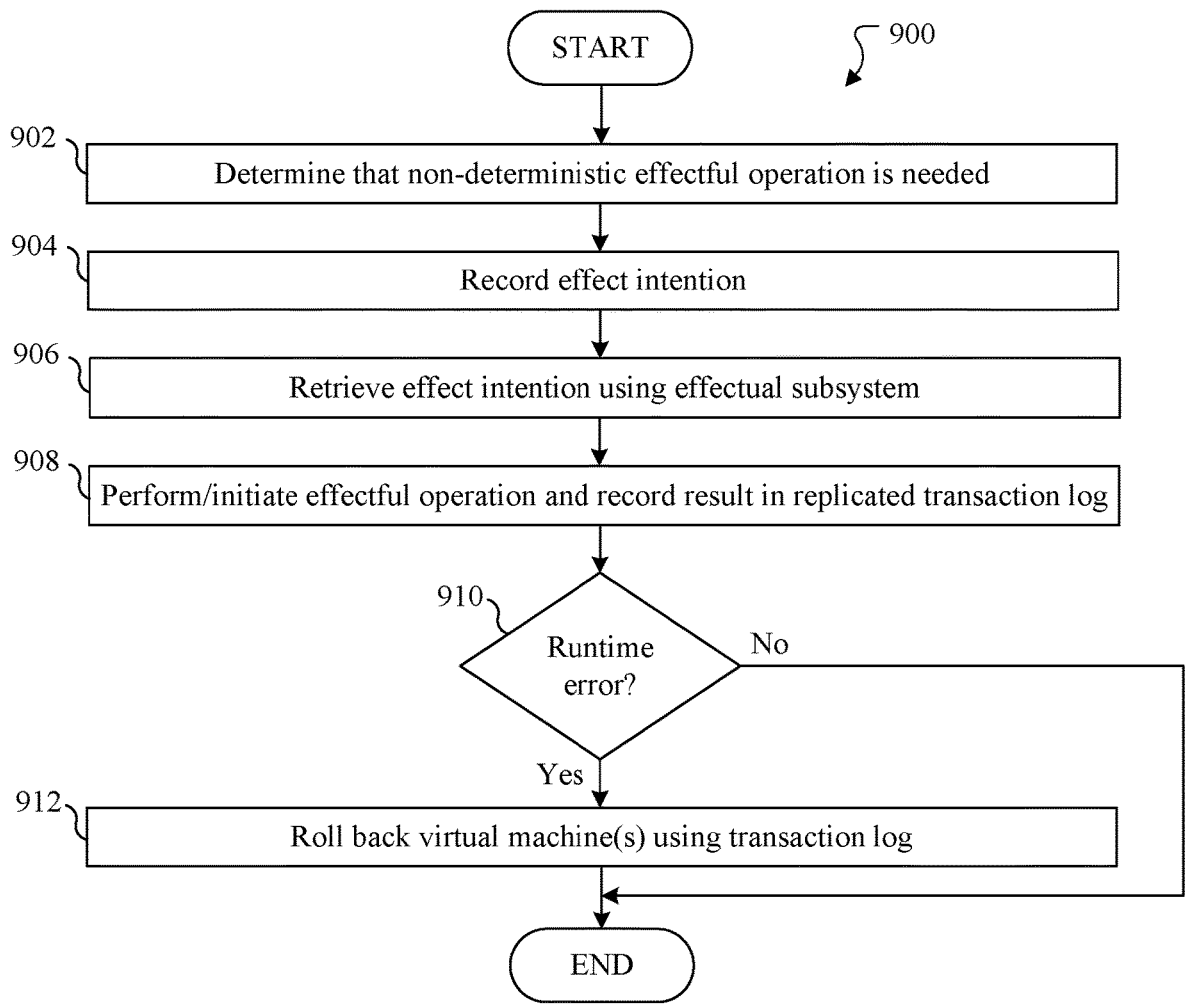
FIG. 9 illustrates an example method for performing effectful operations to support highly-available replicated computing applications using deterministic virtual machines according to this disclosure.

FIG. 9 illustrates an example method 900 for performing effectful operations to support highly-available replicated computing applications using deterministic virtual machines according to this disclosure. For ease of explanation, the method 900 is described as being performed using the virtual machines 306, 308a-308n of a cluster 304 within the distributed computing network 102 in the system 100 as shown in FIG. 1, where the virtual machines 306, 308a-308n can be executed by computing nodes 104a-104x each implemented using at least one device 200 as shown in FIG. 2. However, the method 900 may be performed using any other suitable devices in any other suitable systems.

As shown in FIG. 9, a determination is made that a non-deterministic effectful operation needs to be performed at step 902. This may include, for example, the processing devices 202 of the computing nodes 104a-104x in a cluster 304 executing the virtual machines 306, 308a-308n and determining that an I/O function, time-related function, ID generation function, or other non-deterministic function is being requested by the virtual machines 306, 308a-308n. An effect intention associated with the identified effectful operation is recorded by the virtual machines at step 904. This may include, for example, the processing devices 202 of the computing nodes 104a-104x recording an effect intention in the associated memories 210 of the computing nodes 104a-104x. The effect intention may, for instance, identify the effectful operation to be performed and how, such as by identifying that specific data should be read from a database.

An effectful subsystem retrieves the effect intention at step 906. This may include, for example, the processing device(s) 202 of a computing node 104a-104x that implements the effectful subsystem reading the effect intention from at least one memory of at least one virtual machine 306, 308a-308n. The effectful subsystem performs or initiates performance of the requested effectful operation and records the result in the transaction log at step 908. This may include, for example, the processing device(s) 202 of the computing node 104a-104x that implements the effectful subsystem performing or initiating performance of the requested effectful operation, such as by retrieving requested information from a database, generating a random number, or performing or initiating performance any other suitable requested effectful operation(s).

If there is a runtime error at step 910, the virtual machines are rolled back to a prior application state at step 912. This may include, for example, any of the processing devices 202 of the computing nodes 104a-104x associated with the cluster 304 or the effectful subsystem identifying a runtime error. This may also include the processing device(s) 202 of one or more of the computing nodes 104a-104x associated with the cluster 304 causing one or more of the virtual machines 306, 308a-308n to roll back to or restore a prior application state. This can be easily accomplished due to, for instance, the use of immutable data types.

Although FIG. 8 illustrates one example of a method 800 for supporting highly-available replicated computing applications using deterministic virtual machines and FIG. 9 illustrates one example of a method 900 for performing effectful operations to support highly-available replicated computing applications using deterministic virtual machines, various changes may be made to FIGS. 8 and 9. For example, while each figure shows a series of steps, various steps in each figure may overlap, occur in parallel, occur in a different order, or occur any number of times (including zero times). As a particular example, a runtime error may be detected and a rollback may be triggered at any suitable time(s). As another particular example, a node may fail and be restored or a new node may be brought online into a cluster prior to the occurrence of any bytecode upgrades.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate." as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of." when used with a list of items, means that different combinations of one or more of the listed items may be used, and only one item in the list may be needed. For example, "at least one of: A. B. and C" includes any of the following combinations: A, B, C, A and B, A and C. B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member." "apparatus." "machine," "system," "processor." or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure Other changes, substitutions, and alterations are also possible without departing from the spirit and scope of this disclosure, as defined by the following claims.

What is claimed is:

1. A method comprising:
    executing replicated virtual machines on multiple computing nodes within a cluster in a distributed computing network, the virtual machines including an application that is executed by the multiple computing nodes, the application of each virtual machine comprising bytecode;
    sequentially recording, in a replicated transaction log used by the virtual machines, transactions of the virtual machines and one or more upgrades to the bytecode of the application;
    generating, for each of the computing nodes, one or more snapshots and truncating the replicated transaction log, each snapshot capturing an application state and the bytecode of the associated virtual machine;
    in response to restoration of at least one of the computing nodes in the cluster or an addition of at least one additional computing node to the cluster, restoring one or more of the virtual machines to a current application state of one or more others of the virtual machines using the transaction log and at least one of the one or more snapshots;
    determining that an effectful operation is to be performed on behalf of the virtual machines;
    writing an effect intention into at least one memory associated with at least one of the virtual machines;
    obtaining, via the transaction log, a result of the effectful operation as performed by an effectful subsystem in response to the effect intention; and
    using, at each of the virtual machines, the result of the effectful operation as contained in the transaction log.

2. The method of claim 1, wherein each virtual machine is restricted to executing deterministic operations when executing the bytecode such that each virtual machine produces a common application state when presented with common input data.

3. The method of claim 1, wherein each virtual machine is restricted to using specified immutable data types when executing the bytecode such that (i) a change to a data value by each virtual machine creates a new copy of the data value and (ii) a rollback to a prior application state is achievable using a prior copy of the data value.

4. The method of claim 1, wherein restoring the one or more virtual machines comprises:
    loading a most-recent snapshot into each of the one or more virtual machines; and
    replaying the transactions in the transaction log using the one or more virtual machines.

5. The method of claim 4, wherein replaying the transactions comprises:
    processing one or more transactions in the transaction log using the bytecode as contained in the most-recent snapshot; and
    processing one or more subsequent transactions in the transaction log using the one or more upgrades to the bytecode as contained in the transaction log.

6. The method of claim 1, wherein:
    the virtual machines in the cluster include a leader virtual machine and multiple follower virtual machines;
    each virtual machine supports remotely-callable functions to (i) upgrade the bytecode used by the virtual machine, (ii) request a transaction by the virtual machine, and (iii) process stale read and streaming read requests associated with older application states of the virtual machine; and
    the follower virtual machines are configured to receive the stale read and streaming read requests without having the stale read and streaming read requests be provided by the leader virtual machine.

7. The method of claim 1, wherein the effectful operation represents a non-deterministic function.

8. A system comprising:
    multiple computing nodes configured to execute replicated virtual machines within a cluster in a distributed computing network, the multiple computing nodes configured to execute an application of the virtual machines, the application of each virtual machine comprising bytecode;
    wherein each computing node, when executing the associated virtual machine, is configured to:
        sequentially record, in a replicated transaction log used by the virtual machines, transactions of the virtual machine and one or more upgrades to the bytecode of the application; and
        generate, for the computing node, one or more snapshots and truncate the replicated transaction log, each snapshot capturing an application state and the bytecode of the associated virtual machine;

wherein, in response to restoration of at least one of the computing nodes in the cluster or an addition of at least one additional computing node to the cluster, at least one of the computing nodes is configured to restore one or more of the virtual machines to a current application state of one or more others of the virtual machines using the transaction log and at least one of the one or more snapshots; and wherein the computing nodes are further configured to:
determine that an effectful operation is to be performed on behalf of the virtual machines;
write an effect intention into at least one memory associated with at least one of the virtual machines;
obtain, via the transaction log, a result of the effectful operation as performed by an effectful subsystem in response to the effect intention; and
use, at each of the virtual machines, the result of the effectful operation as contained in the transaction log.

9. The system of claim 8, wherein each virtual machine is restricted to executing deterministic operations when executing the bytecode such that each virtual machine produces a common application state when presented with common input data.

10. The system of claim 8, wherein each virtual machine is restricted to using specified immutable data types when executing the bytecode such that (i) a change to a data value by each virtual machine creates a new copy of the data value and (ii) a rollback to a prior application state is achievable using a prior copy of the data value.

11. The system of claim 8, wherein, to restore the one or more virtual machines, each computing node is configured to:
load a most-recent snapshot into the associated virtual machine; and
replay the transactions in the transaction log using the associated virtual machine.

12. The system of claim 11, wherein, to replay the transactions, each computing node is configured to:
process one or more transactions in the transaction log using the bytecode as contained in the most-recent snapshot; and
process one or more subsequent transactions in the transaction log using the one or more upgrades to the bytecode as contained in the transaction log.

13. The system of claim 8, wherein:
the virtual machines in the cluster include a leader virtual machine and multiple follower virtual machines;
each virtual machine is configured to support remotely-callable functions to (i) upgrade the bytecode used by the virtual machine, (ii) request a transaction by the virtual machine, and (iii) process stale read and streaming read requests associated with older application states of the virtual machine; and
the follower virtual machines are configured to receive the stale read and streaming read requests without having the stale read and streaming read requests be provided by the leader virtual machine.

14. The system of claim 8, wherein the effectful operation represents a non-deterministic function.

15. A non-transitory computer readable medium containing instructions that when executed cause each of multiple computing nodes to:
execute a replicated virtual machine within a cluster in a distributed computing network, the virtual machine including an application that is executed by the computing node, the application comprising bytecode;
sequentially record, in a replicated transaction log used by the virtual machines, transactions of the virtual machine and one or more upgrades to the bytecode of the application;
generate one or more snapshots and truncate the replicated transaction log, each snapshot capturing an application state and the bytecode of the virtual machine;
in response to restoration of the computing node, restore the virtual machine to a current application state of one or more others of the virtual machines using the transaction log and at least one of the one or more snapshots;
determine that an effectful operation is to be performed on behalf of the virtual machine;
write an effect intention into at least one memory associated with at least one of the virtual machines;
obtain, via the transaction log, a result of the effectful operation as performed by an effectful subsystem in response to the effect intention; and
use, at the virtual machine, the result of the effectful operation as contained in the transaction log.

16. The non-transitory computer readable medium of claim 15, wherein each virtual machine is restricted to executing deterministic operations when executing the bytecode such that each virtual machine produces a common application state when presented with common input data.

17. The non-transitory computer readable medium of claim 15,
wherein each virtual machine is restricted to using specified immutable data types when executing the bytecode such that (i) a change to a data value by each virtual machine creates a new copy of the data value and (ii) a rollback to a prior application state is achievable using a prior copy of the data value.

18. The non-transitory computer readable medium of claim 15,
wherein the instructions that when executed cause each computing node to restore the virtual machine comprise:
instructions that when executed cause each computing node to:
load a most-recent snapshot into the virtual machine; and
replay the transactions in the transaction log using the virtual machine.

19. The non-transitory computer readable medium of claim 18, wherein the instructions that when executed cause each computing node to replay the transactions comprise:
instructions that when executed cause each computing node to:
process one or more transactions in the transaction log using the bytecode as contained in the most-recent snapshot; and
process one or more subsequent transactions in the transaction log using the one or more upgrades to the bytecode as contained in the transaction log.

20. The non-transitory computer readable medium of claim 15, wherein, in each computing node, the virtual machine is configured to support remotely-callable functions to (i) upgrade the bytecode used by the virtual machine, (ii) request a transaction by the virtual machine, and (iii) process stale read and streaming read requests associated with older application states of the virtual machine.

21. The non-transitory computer readable medium of claim 15, wherein the effectful operation represents a non-deterministic function.

\* \* \* \* \*